Figure 3:
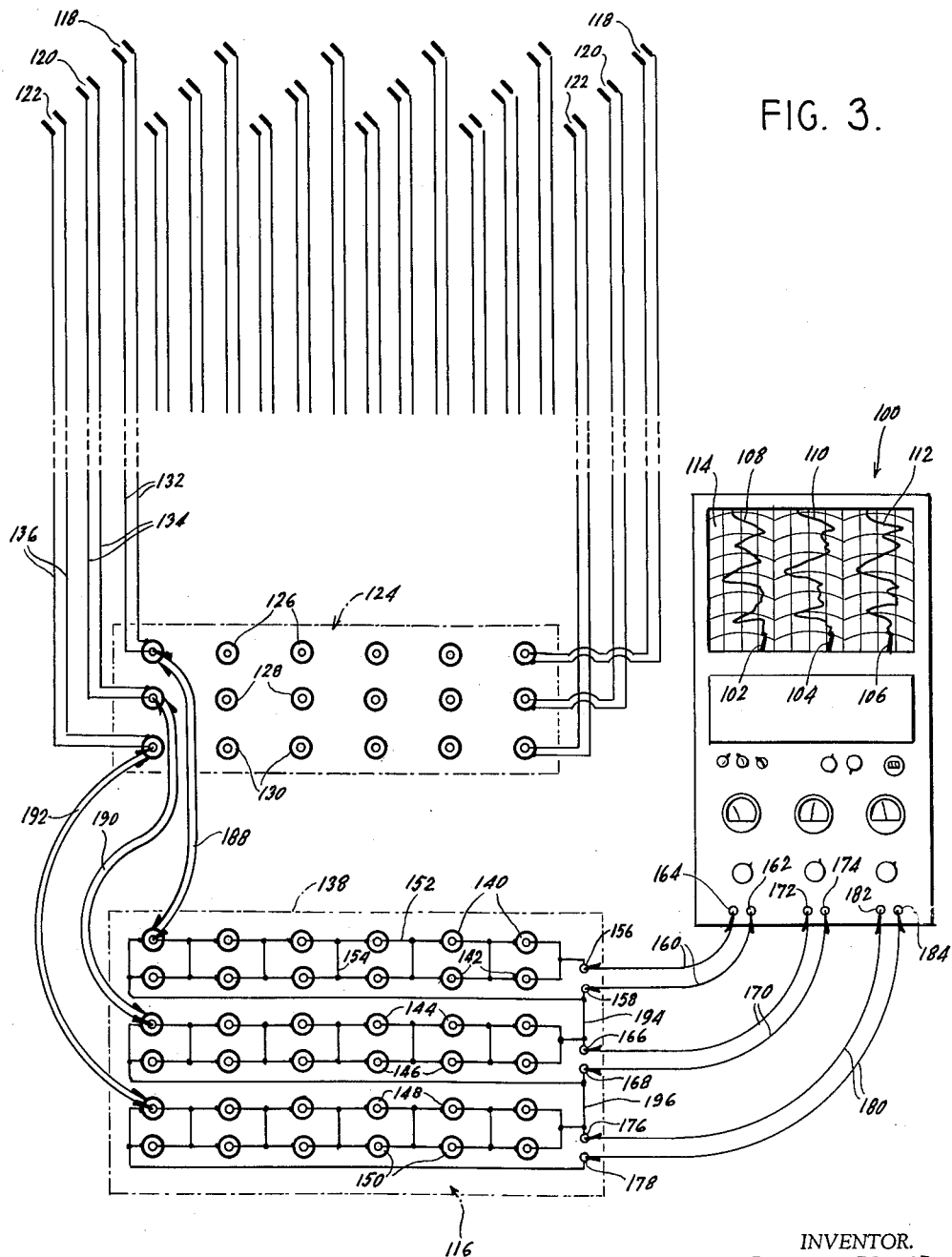

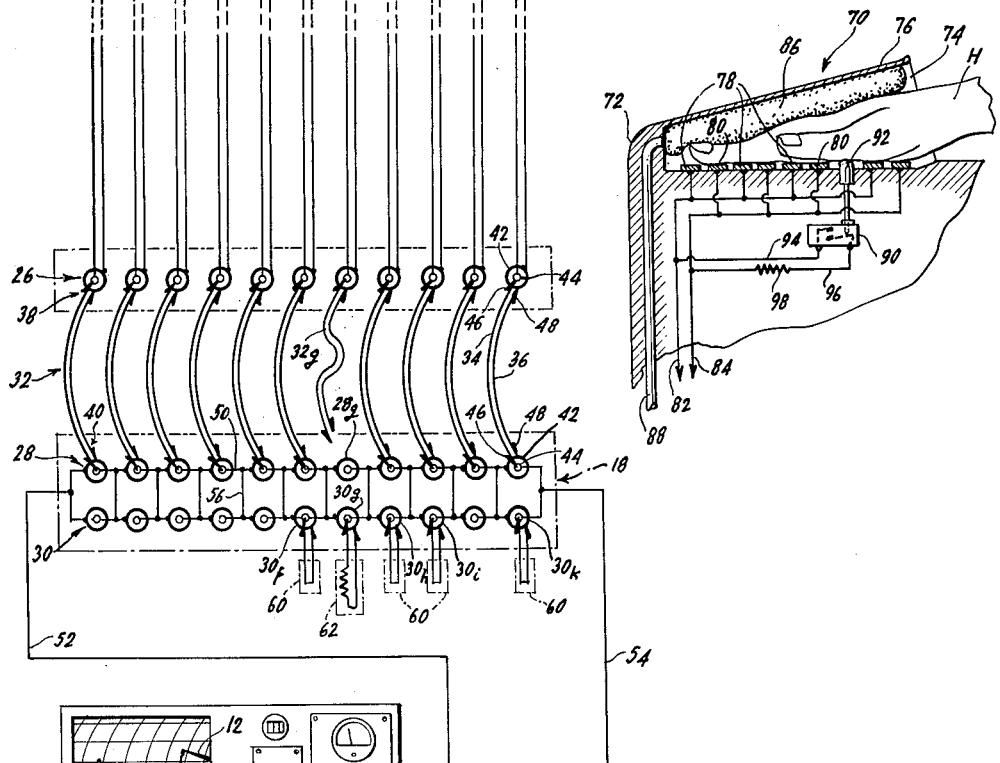

May 15, 1962  G. C. BACKSTER, JR  3,034,500
METHOD AND APPARATUS FOR MEASURING AND RECORDING GROUP REACTIONS
Filed May 2, 1957  2 Sheets-Sheet 2

INVENTOR.
GROVER C. BACKSTER JR.
BY
Amster + Levy
ATTORNEYS

United States Patent Office 3,034,500
Patented May 15, 1962

3,034,500
METHOD AND APPARATUS FOR MEASURING AND RECORDING GROUP REACTIONS
Grover C. Backster, Jr., 26 Hugo St., Clifton, N.J.
Filed May 2, 1957, Ser. No. 656,625
8 Claims. (Cl. 128—2.1)

This invention relates to electrical measuring instruments and in particular to a novel system and instrument arrangement for measuring and recording emotional reactions and responses of selected groups composed of a plurality of persons, for example measuring audience reactions to entertainment or the like.

The desirability of measuring and recording group reactions and emotions has been recognized for a considerable time, and efforts have been made in this direction without success. Such testing of group reactions is particularly desirable in the evaluating of entertainment such as motion picture films, television programs, commercials, stage presentations or the like, where it would be extremely valuable to the producers to pre-test their programs in order to ascertain what the audience reaction will be to the program as a whole as well as to specific portions thereof. Obviously, if it is found in pretesting that the audience would have an adverse reaction to certain parts of the program, these parts would be omitted or changed before the program was released to the general public.

Up to the present time, attempts at evaluating entertainment or the like have been limited to presenting a preview of the program to a representative group and watching the individual members of the group to observe their reactions. In addition, it is common practice to distribute audience cards which are to be filled in and returned by members of the audience. These methods have been found to be highly inaccurate and ineffective for many reasons. Many audience reactions are not readily visible or apparent so that they cannot be identified by observation of the audience. In addition, individuals in the audience experience subconscious reactions and emotions of which even the individuals are not consciously aware and therefore do not report on the audience cards. Further, many individuals purposely submit inaccurate reports on the mistaken presumption that they should go along with the feelings of the rest of the audience, or for the reason that they are ashamed to reveal their true feelings. Finally, written reports at best give an indication of the general audience reaction to the entire program, but do not isolate those portions of the program which produce significant responses and reactions.

According to the present invention, there is provided an electronic system for automatically measuring and recording emotional reactions and responses of a group of individuals, the reactions being reflected by changes in the skin conductivity of the individuals in the group, and being recorded on a graph which represents the average reaction of the entire group per unit of time.

An object of the invention is the provision of a measuring system of the character described which will pick up, measure and record all reactions of the group whether conscious or sub-conscious.

Another object of the invention is the provision of a measuring system of the character described in which the graph can be keyed in time sequence to the program being viewed by the group, so that any significant reaction recorded on the graph may be matched to the corresponding portion of the program.

In its general aspects the invention contemplates providing a recording galvanometer with a plurality of electrode pairs connected in series, and connecting each pair of electrodes to a person of the test group, the galvanometer measuring and recording changes in skin conductivity of the individuals in the group, caused by galvanic skin reflex.

A further object of the invention is to provide control means, preferably in the nature of a control board located in a control room remote from the group being tested, the control board being arranged to permit selection of individuals for testing as part of the group, and to permit individuals to be selectively eliminated from the group, either before or during the testing period. These control means provide a wide flexibility in conducting the tests and can be used to eliminate undesirable individuals, divide the tested group into sub-groups such as male or female groups, or completely rearrange the tested groups during the presentation of the program, all without disturbing the individuals, and without knowledge of the audience.

A further object of the invention is the provision of a measuring system of the character described in which the electrodes used to contact the skin of the tested individuals are built into the seats occupied by the audience and are provided with a novel construction which affords improved and effective uniform skin contact without subjecting the audience to discomforture or causing nervousness.

Additional objects and advantages of the invention will become apparent during the course of the following specification when taken in connection with the accompanying drawings, in which:

FIG. 1 is a schematic view showing a measuring instrument, control board, and electrodes, arranged and connected together in accordance with the invention; the arrangement being adapted to test a group of eleven persons, but only seven persons being actually tested;

FIG. 2 is a vertical section through a portion of the arm of one of the chairs used to seat an individual being tested, and showing an improved electrode arrangement for being contacted by the hand of an individual; and FIG. 3 is a schematic view of a modified testing instrument and arrangement showing the instrument, control board and electrodes adapted to test a group of eighteen individuals, a portion of the electrode wiring being broken away for clarity of illustration.

Referring in detail to FIG. 1, reference numeral 10 represents a recording instrument of the conventional type used for measuring changes in skin conductivity caused by galvanic skin reflexes. Such instrument is a sensitive galvanometer operating on a Wheatstone bridge principle, and reflects very slight changes in skin conductivity by movement of a recording arm or stylus 12. The recording instrument 10 contains a continuous length of graph paper 14 which is slowly advanced beneath the stylus 12. Operation of recording instruments of this type is well-known and will therefore not be described in detail. Suffice to say that such machines normally are equipped with a pair of metal electrodes which are attached by spring bands or the like to the body of a person in spaced relationship to each other. When a low voltage electrical current is sent to the attached electrodes by the instrument, small changes in skin conductivity between the electrodes, caused by emotional reactions of the person, are amplified by the instrument and reflected in movement of the stylus 12 which draws a line 16 representing a variable amplitude plot on the moving graph paper 14.

Up to the present time, such measuring instruments have been employed by psychiatrists, and for lie detection purposes to measure and record emotional responses of a single person at a time. Such testing finds use, for example, by psychiatrists and for lie detection purposes.

According to the present invention, the measuring instrument 10 is utilized in measuring and recording emotional reactions of a group of persons, producing by a single stylus line a graphical representation of the average reaction of the group. For this purpose, the electrodes attached to the individuals in the group being tested are wired in series to the instrument.

FIG. 1 also shows a control board or panel, generally designated by reference numeral 18, by means of which the selection of the individuals in the group may be controlled at a remote point, preferably in a control room separated from the test group. Since the skin resistances of the individuals in the group are additive in the series circuit, the number of persons included in the group for measurement by a single instrument is, of course, limited. It has been found that a single instrument can effectively measure and record emotional responses of groups consisting of from ten to fifteen individuals, and for purposes of illustration the instrument 10 in FIG. 1 is provided with eleven pairs of electrodes 20a—20k for the testing of a group having a maximum of eleven individuals.

It is preferred that each pair of electrodes will be attached to or built into the respective seats in which the members of the group will be sitting. If the group is in the nature of an audience, the seats may be arranged in the usual rows. The lead wires connected to the individual pairs of electrodes are extended back to a control room in which the control board 18 and recording instrument 10 are located, and from which the operator may observe the group as well as the recorded results on the instrument for regulating the test during the actual testing period.

Thus, each pair of electrodes 20a—20k are connected by a pair of lead wires 22 and 24 to respective sockets 26, which are identical and are preferably arranged in a row. On the control board, beneath the first row of sockets 26 is another row of eleven sockets 28 of similar construction, while beneath the row of sockets 28 a third row of similar sockets 30 is disposed.

The sockets 26 of the first row may be individually connected to the respective sockets 28 of the second or central row, as desired by the operator, by means of plug units 32, each comprising a pair of lead wires 34 and 36, connected at each end to plugs 38 and 40. The sockets 26, 28, and 30 are all of the usual type having a pair of contacts, for example, the socket wall 42 representing one contact and a central contact 44 being located at the bottom of the socket. Each of the plugs 38 and 40 is also of conventional construction and has one terminal 48 adapted to engage the socket wall contact 42 and a second terminal 46 adapted to engage the socket central contact 44.

The central row of sockets 28 are connected in series by leads 50 which connect the central contact 44 of one socket 28 to the wall contact 42 of the next succeeding socket 28. The end sockets 28 are connected by leads 52 and 54 to the input terminals of the recording instrument 10.

The third row of sockets 30 are connected in parallel to the individual adjacent sockets 28 of the central row by leads 56, which connect the central contact of each socket 28 to the central contact of the corresponding socket 30 and the wall contact of each socket 28 to the wall contact of the corresponding socket 30.

In the normal operation of the arrangement, all of the plug units 32 are employed to connect each socket 26 to its corresponding socket 28. This wires each pair of electrodes 20a—20k in series, and in order for the circuit to the instrument 10 to be completed, each pair of electrodes must be bridged by contacting the skin of a person in the group. The individuals comprising the group will sit in their chairs with a portion of their bodies in contact with the respective pair of electrodes. Preferably the hands H of the individuals are pressed against the pairs of electrodes, as indicated in FIG. 1. If, however, there are less than eleven persons in the group, so that some of the seats are unoccupied and their electrodes unbridged, the circuit can still be completed by inserting jumper plugs in the sockets 30 of the last row which correspond to the vacant seats. In FIG. 1, four pairs of electrodes 20f, 20h, 20i, and 20k, are shown not in use. In each instance, the corresponding third-row sockets 30f, 30h, 30i and 30k contain jumper plugs 60 which connect the socket central contacts 44 with the wall contacts 42 and short out the respective sockets, completing the series circuit of the row of sockets 28. Thus, the arrangement may be used for the testing of groups of from two to eleven individuals located in any of the seats.

The jumper plugs 60 may also be employed to select any sub-group from the main group before the testing period begins. For example, the group may consist of male and female individuals, all of whom are seated in their chairs with their hands attached to the electrodes. If it is decided, for one particular test, to measure the reactions of the females only, the male individuals can be eliminated from the group simply by inserting jumper plugs 60 in the sockets 30 corresponding to the seats occupied by the males. The operator is thus given a wide and flexible degree of selectivity, the selection being accomplished rapidly and without knowledge of members in the group.

Selection by means of the jumper plugs 60 can be made before a particular test is commenced, since the operator will have the opportunity of adjusting the test instrument. This adjustment is necessary in order to center the stylus 12 on the graph 14, as the total resistance varies in accordance with the number of persons being tested. If an individual is eliminated from the test during the testing period by means of a jumper plug, the total resistance would be decreased and the pre-set stylus line would be shifted on the graph causing confusion and possible error in interpreting the results.

It may often occur, however, that during the actual testing period, the operator, in observing the group, may decide to eliminate one or more persons. For example, in an audience viewing entertainment, a person may be observed to be restless or uncooperative. In such an event, means are provided for eliminating this person without interfering materially with the graph pattern. In FIG. 1, it is assumed that the person contacting the pair of electrodes designated 20g, is to be eliminated from testing. A resistance element plug 62 is inserted in the corresponding third row socket 30g, and the plug 32g is then withdrawn from the corresponding second-row socket 28g. This has the effect of wiring the resistance element of plug 62 in the series circuit of the row of sockets 28. The resistance of the resistance element is selected to match the average resistance of the skin and will, of course, depend upon the length or size of the electrodes 20a—20k and the distance by which the electrodes of each pair are separated.

In testing the group, the desired number of persons contacting the electrodes are wired into the series circuit and the program is commenced. Any emotion felt by an individual in the test group will be represented by a change in skin conductivity between the pair of electrodes contacting the person, which will vary the resistance of the circuit and be shown on the recording galvanometer by a fluctuation of the graph line. The graph is keyed by time markings to the elapsed time of the program, so that the operator may later know which portions of the program produced group reactions, and to what degree.

In connecting the electrodes to the members of the group, care must be taken to provide firm contact of the electrodes against the skin, while at the same time to avoid nervousness and discomfort in the individuals. It has been found that the use of straps or flexible bands to attach the electrodes to the hands or arms, causes some persons to become uneasy, which has an adverse effect upon the test results. FIG. 2 illustrates an assembly for applying the hands to the contacts. This assembly comprises a hood or hollow housing 70 which is preferably built into the arm 72 of the chair on which the individual is seated. The housing 70 has a rear open end 74 which is sized to receive the hand H of the person being tested. The top wall 76 of housing 70 is inclined downwardly toward the rear of the housing so that the interior of the housing 70 conforms to the general shape of the hand H. As a practical example, the interior of the housing 70 may be one inch in height at its front end and three inches in height at its open rear end.

A plurality of conductive metal strips 78, 80 are mounted in parallel, spaced relationship within the housing 70 on the bottom surface thereof. The strips 78 alternate with the strips 80. The strips 78 and 80 constitute the electrodes, the strips 78 being all wired to a lead 82, also connected to the measuring instrument. Division of the two electrodes into a plurality of strips affords the measurement of a greater skin area on the hand for increased sensitivity.

A flexible air-tight bag or bladder 86 is secured to the inner surface of the housing top wall 76. When the hand H of the person being tested is inserted in the housing 70 with the palm and fingers resting upon the electrode strips 78 and 80, the bag 86 is inflated with air, so that in expanding it applies and maintains a uniform pressure upon the top of hand H. The hand is therefore firmly but comfortably pressed against the electrode strips. For the purposes of filling the bag 86, an air duct 88 may extend through the chair arms 72. If the group to be tested consists of more than two people, the bags 86 of each seat will be interconnected and coupled to a pump or compressed air tank so that pressure against the hands of all the test individuals will be uniform. If only two persons are to be tested, the bags can be filled individually by means of pump bulbs having attached pressure gauges.

The housing 70 is also provided with a safety switch 90 arranged to prevent the series connection with the instrument from being opened in the event that one of the test individuals withdraws his hand from the housing during the testing operation. The switch 90 is of the usual on-off type, and has an upstanding actuating plunger 92 which is normally biased to a raised position in which its head is located above the level of the electrode strips 78 and 80. This upward biasing of plunger 92 can be provided by any type of spring means, for example a spring contact strip within the switch 90. The terminals of switch 90 are connected across the leads 82, 84 by leads 94 and 96. The lead 96 has a resistor 98, the resistance of which is matched to the skin resistance of a person being tested.

When the hand H is inserted within the housing 70 and the flexible bag 86 inflated, downward pressure of the hand will depress plunger 92, opening the switch 90 and disconnecting the resistor 98 from the circuit between the electrodes and the measuring instrument. In the event that the hand H is withdrawn during the testing period, the spring-loaded plunger 92 will immediately be raised, closing switch 90 and connecting the resistor 98 in the series circuit of the instrument. Thus, the series circuit will not be interrupted, and no significant deflection of the stylus line will appear on the recorded graph.

FIG. 3 illustrates a modified instrument and control board for testing larger groups simultaneously. The measuring instrument 100 is of the same type as the instrument 10 shown in FIG. 1, except that it is adapted to record a plurality of stylus lines simultaneously. In the illustrated embodiment three styluses 102, 104 and 106 are shown recording three graph lines 108, 110 and 112 separately from three separate audience groups. The three graph lines are distinct and may vary from one another, but are reproduced on the same sheet 114 of graph paper for ready comparison.

As shown schematically in FIG. 3, the audience is divided into three groups, each shown as arranged in a respective row, although it is to be understood that in practice the groups may be scattered and may be located in any haphazard arrangement, the selection of the groups being accomplished at the control board 116. The rows representing the individual groups of persons being tested are provided with respective pairs of electrodes 118, 120 and 122, the electrodes being of the same type as previously described. By way of illustration, each row, or each group of persons, is shown as having six pair of electrodes, although the number may be varied as desired.

The control board 116 has an upper panel 124 containing three rows of sockets 126, 128, and 130, corresponding to the three rows of electrodes. The pairs of electrodes 118 are connected to the top row of sockets 126 by leads 132, while electrodes 120 are connected to the central row of sockets 128 by leads 134, and electrodes 122 are connected to the lower row of sockets 130 by leads 136.

The control board 116 also includes a lower control panel 138 which has six rows of six sockets each. These sockets are arranged in pairs of rows, the uppermost pair consisting of sockets 140, 142, the central pair of rows consisting of sockets 144, 146, and the lowermost pair of rows consisting of sockets 148, 150.

Each pair of rows of sockets on panel 116 is wired in a circuit similar to the circuit previously described in connection with the sockets 28, 30 of FIG. 1. Referring to the upper pair of rows of sockets 140 and 142, for example, the row of sockets 140 are wired in series by leads 152, while the sockets 142 are wired in parallel to the corresponding sockets 140 by leads 154. Similarly, the rows of sockets 144 and 148 are wired in series with the respective sockets 146 and 150 wired in parallel therewith.

The series circuit of sockets 140 and 142 has a pair of terminals 156, 158 which are connected by leads 160 to the terminals 162, 164 of the measuring instrument 100, the instrument terminals 162, 164 being in circuit with the stylus 102. Similarly, the circuit of sockets 144 and 146 has terminals 166, 168 connected by leads 170 to instrument terminals 172, 174, the latter being in circuit with the central stylus 104. The circuit of sockets 148 and 150 has terminals 176, 178 connected by leads 180 to the instrument terminals 182, 184 which control stylus 106.

The upermost row of sockets 126 of panel 124 are adapted to be connected to the top row of sockets 140 of panel 138 by plug assemblies 188 which are identical to the plug assemblies 32 previously described. The central row of sockets 128 of panel 124 are adapted to be connected to the row of sockets 144 of panel 138 by plug assemblies 190, while the lowermost row of sockets 130 of panel 124 are adapted to be connected by plug assemblies 192 to the row of sockets 148 of panel 138. For clarity of illustration, only one of each of the plug assemblies 188, 190 and 192 is shown in FIG. 3, it being understood that there are six of each of the plug assemblies, one for each of the sockets in the three rows of panel 124.

It will thus be appreciated that with the wiring arrangement indicated in FIG. 3, the row of electrodes 118 is connected through sockets 126, plug assemblies 188, sockets 140, and leads 160 to the stylus 102 of the measuring instrument 100, so that the reactions of persons tested by the electrodes 118 will be represented by the graph line 108. This graph line will be independent of the other two graph lines on the graph paper 114. If less than six persons are in contact with the electrode pairs 118, the series circuit can be completed by inserting jumper plugs within the corresponding sockets 142, in the manner previously described in connection with FIG. 1. In addition sockets 142 may be utilized for the insertion of resistance sockets, as previously described, if it is desired to eliminate one or more of the persons being tested by electrodes 118, during the testing period.

In an identical manner, the test electrodes 120 are connected to the instrument stylus 104, while electrodes 122 are connected to stylus 106. By rearranging the plug assemblies 188, 190 and 192, it is possible to group the persons being tested in any desired arrangement regardless of their seating locations. For example, the audience may be selectively grouped so that one graph represents men, one graph women, and one graph children.

The control panel 138 is so wired that all eighteen electrodes may be wired in series to a single stylus, so that a single graph line will represent the average reaction of the entire group of eighteen persons. For this purpose, the terminal 158 is connected to terminal 166 by a lead 194, while terminal 168 is connected to terminal 176 by a lead 196. These connections by leads 194 and 196 have no effect on the individual series circuits when the instrument is wired as shown in FIG. 3 to produce three graphs. However, if it is desired to produce a single graph, for example to utilize only the stylus 102, the instrument terminals 172, 174, 182 and 184 would be disconnected by removing the pairs of leads 170 and 180. One of the leads 160 would still be used to connect the terminal 156 to instrument terminal 164. The other lead 160 would be disconnected from terminal 158 and connected to the lowermost panel terminal 178, so that the terminal 178 is connected to instrument terminal 162. In this circuit, the rows of sockets 140, 144 and 148 are connected in series between the instrument terminals 162 and 164, so that stylus 102 will record impulses received from all electrodes 118, 120 and 122 in a single stylus line.

While preferred embodiments of the invention have been shown and described herein by way of illustration, it is obvious that numerous additions, changes, and omissions may be made in such embodiments without departing from the spirit and scope of the invention.

I claim:

1. Apparatus for measuring and recording emotional reactions of a group composed of a plurality of persons, comprising a recording galvanometer, a set of spaced electrodes for each person in said group, a housing enclosing each set of electrodes and sized to receive the hand of a respective person in said group, inflatable means within the housing, means for inflating said inflatable means in each housing sufficiently to cause the inflatable means to press the hand against said set of electrodes and means to connect the sets of electrodes in series to the recording galvanometer, whereby said galvanometer derives signal input in series from each person of said group corresponding to changes in skin resistance of each person.

2. Measuring and recording apparatus according to claim 1 in which each set of electrodes comprises a row of spaced metal strips arranged to run transversely across the hand, each alternate strip being connected in parallel to constitute an electrode of the set.

3. Apparatus for measuring and recording emotional reactions of a group composed of a plurality of persons, comprising a recording galvanometer, a set of spaced electrodes for each person in said group, a housing enclosing each set of electrodes and sized to receive the hand of a respective person in said group, said set of electrodes being mounted on one wall of said housing, a flexible bag mounted on the opposite wall of said housing, means for inflating said bag to cause the latter to press the hand against said set of electrodes, and circuit means to connect the sets of electrodes in series to the recording galvanometer, whereby said galvanometer derives signal input in series from each person of said group corresponding to changes in skin resistance of each person.

4. Measuring and recording apparatus according to claim 3 in which a switch is disposed adjacent to the housing wall mounting said electrodes, said switch having an actuating plunger extending through said wall and positioned to be contacted and depressed by the hand inserted in said housing in abutment with said electrodes, said switch controlling a safety circuit connected across the circuit means and adapted to short out the electrodes from said circuit means, said switch being opened when said plunger is depressed by the hand, said plunger being spring-loaded to rise when said hand is removed and close said switch to complete said safety circuit.

5. Measuring and recording apparatus according to claim 4 in which said safety circuit includes resistance means corresponding to the normal skin resistance of the person of said group.

6. Apparatus for measuring and recording emotional reactions of groups composed of a plurality of persons, comprising a recording instrument for recording changes in skin resistance of the persons in said group, a pair of electrodes for each person in the group, means to connect the pairs of electrodes in spaced relationship against the skin of the respective persons in the group, a control board located intermediate the electrodes and the recording instrument, said control board including first, second, and third rows of sockets, each socket consisting of central contacts and wall contacts, the central contact of each of the sockets of the second row being connected to the wall contact of a succeeding socket thereof, and the central contact of each of the sockets of the third row being connected to the wall contact of a succeeding socket thereof, while leaving the last central contact and the first wall contact of said second and third rows for connection to said recording instrument, means connecting the recording instrument to said last central contacts and said first wall contacts, means comprising the pairs of electrodes to the respective contacts of the sockets of the first row, a plurality of adjustable plug units connecting selected sockets of the first row to selected sockets of the second row, and the sockets of the third row being connected in parallel to the respective sockets of the second row.

7. Measuring and recording apparatus according to claim 6 in which said control board also includes removable jumper plugs selectively insertable between the contacts of the respective sockets of the third row for shorting out the corresponding sockets of the first row.

8. Measuring and recording apparatus according to claim 6 in which said control board also includes removable resistance plugs selectively insertable between the contacts of the respective sockets of the third row, the resistance of said plugs corresponding to the skin resistance of the person contacting the corresponding electrodes.

References Cited in the file of this patent

UNITED STATES PATENTS

| | | |
|---|---|---|
| 681,868 | Bowen | Sept. 3, 1901 |
| 1,990,489 | Hopkins | Feb. 12, 1935 |
| 2,096,109 | Hopkins | Oct. 19, 1937 |
| 2,400,583 | White | May 21, 1946 |
| 2,412,363 | Silverman | Dec. 10, 1946 |
| 2,452,799 | Speaker | Nov. 2, 1948 |
| 2,657,683 | Koller | Nov. 3, 1953 |
| 2,684,670 | Mathison | July 27, 1954 |
| 2,688,872 | Hartline et al. | Sept. 14, 1954 |
| 2,712,309 | Offner | July 5, 1955 |
| 2,712,976 | Blaustein et al. | July 12, 1955 |

OTHER REFERENCES

Newman: "Electrical Rhythms of the Human Brain," Scientific American, October 1938, pp. 186–8.